July 23, 1968  I. J. VAN GELDER  3,393,543
ROD BENDING APPARATUS
Filed June 30, 1966  3 Sheets-Sheet 1
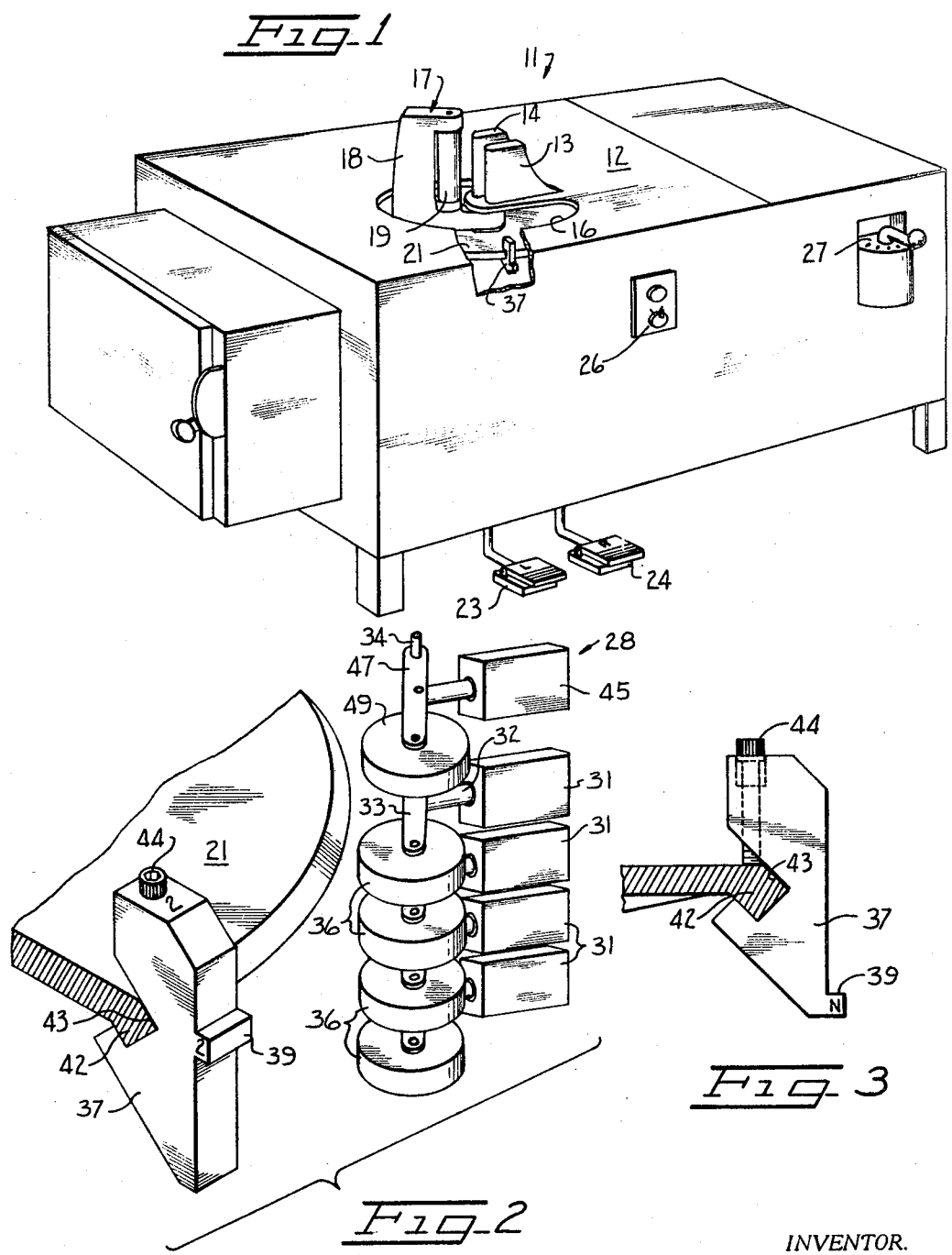
INVENTOR.
IAN J. VAN GELDER
BY
ATTORNEYS July 23, 1968     I. J. VAN GELDER     3,393,543
ROD BENDING APPARATUS
Filed June 30, 1966     3 Sheets-Sheet 2
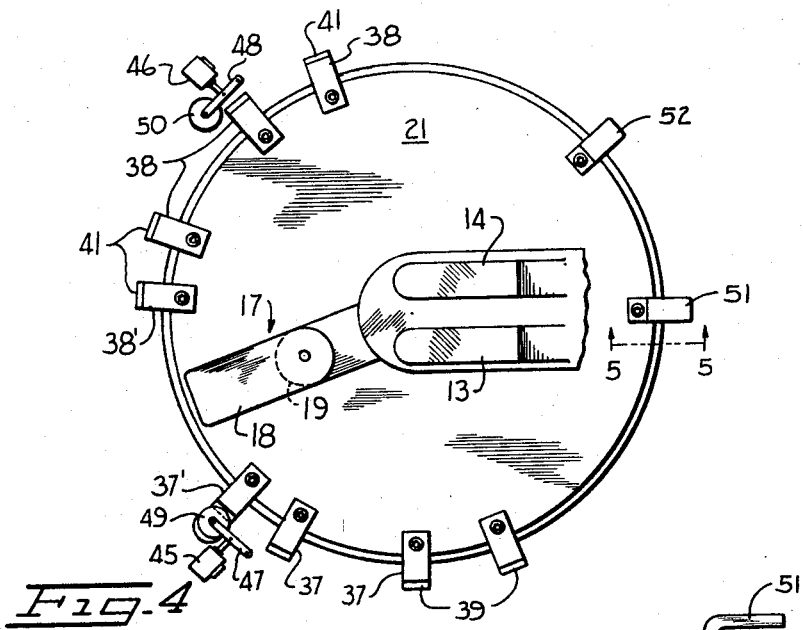
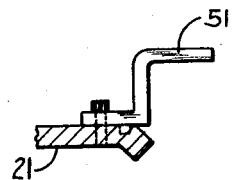
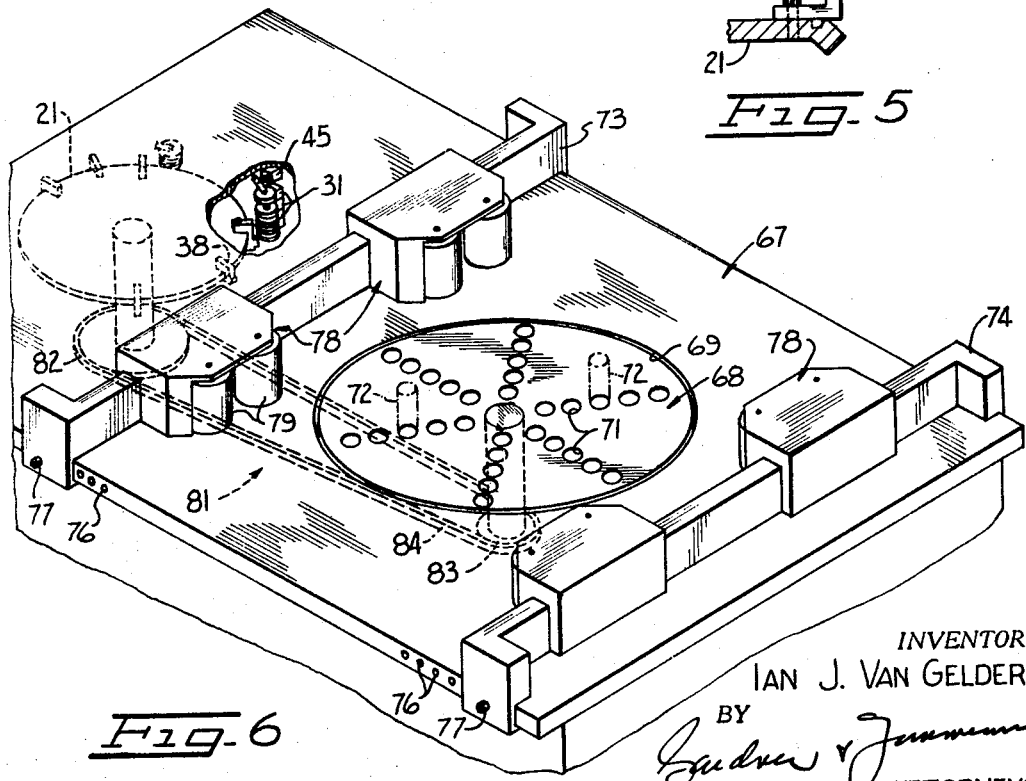
INVENTOR.
IAN J. VAN GELDER
BY
ATTORNEYS

United States Patent Office 3,393,543
Patented July 23, 1968

3,393,543
ROD BENDING APPARATUS
Ian J. Van Gelder, Oakland, Calif., assignor to Van Gelder Machinery, Inc., Oakland, Calif., a corporation of California
Filed June 30, 1966, Ser. No. 561,885
13 Claims. (Cl. 72—26)

This invention relates generally to apparatus for automatically bending rods, such as steel reenforcing rods, through predetermined angles, and is more particularly directed to apparatus of this type which is arranged to bend rods through a plurality of different selectable angles.

Various machines are well known for bending steel reenforcing rods, and the like, in automatic or semi-automatic fashion. Typically such machines include a fixed mandrel against which the rods are positioned, and a rotatable arm or equivalent member for engaging the rods and bending same about the mandrel during rotation of such member. The angle of the bend is determined by the angle of rotation of the arm relative to the fixed mandrel. Such angle of rotation may be controlled in a semiautomatic manner by an operator observing the bending action and controlling the energization of a motor driving the arm. In this regard the operator stops the motor when the desired angle of bend is observed to be achieved. Alternatively, automatic control of the angle of bend may be provided by suitable stops, limit switches, or the like for stopping rotation of the arm after it has rotated through a predetermined bending angle. For most applications automatic control of the bending angle is preferred inasmuch as the semiautomatic control is susceptible to human error and the angle of bend should be relatively precise.

Heretofore bending machines of the type outlined hereinbefore having automatic control of the angle of bend have been somewhat limited and disadvantageous in that once set up they are capable of producing only a single predetermined angle of bend. When it is desired to provide a different angle of bend it is necessary to shut down the machine and reset the positions of the stops, limit switches, etc., of the control mechanism to provide the different angle of rotation of the bending arm.

It is therefore an object of the present invention to provide rod bending apparatus capable of automatically producing a plurality of different predetermined angles of bend which are readily selectable without resetting of angle determining components of the control mechanism.

Another object of the invention is the provision of a fully automatic bending machine with multiple selectable bending angles which may be preset to substantially any desired angles.

Still another object of the invention is to provide apparatus of the class described which may be operated semiautomatically under the control of an operator to produce bend other than those preset for automatic operation.

It is yet another object of the invention to provide rod bending apparatus of the class described which may be operated selectively to produce both right (clockwise) and left (counterclockwise) bends.

It is a further object of the invention to provide rod bending apparatus of the class described having means for limiting extreme rotation of the bending arm is either the semiautomatic or automatic modes of operation in order to prevent the arm from destructively impacting adjacent portions of the work table.

Another object of the invention is the provision of rod bending apparatus which may be arranged to simultaneously effect oppositely directed bends at the opposite ends of a rod.

A still further object of the invention is to provide rod bending apparatus which may be arranged to automatically control bends in both directions having relatively large angles.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

FIGURE 1 is a perspective view of rod bending apparatus in accordance with the present invention.

FIGURE 2 is a fragmentary perspective view of bend angle control mechanism of the apparatus.

FIGURE 3 is a fragmentary sectional view through a cam disc of the control mechanism illustrating the manner of securance of a switch contacting element thereto.

FIGURE 4 is a fragmentary plan view of the apparatus illustrating particularly the arrangement of the control mechanism.

FIGURE 5 is a sectional view taken at line 5—5 of FIGURE 4.

FIGURE 6 is a fragmentary perspective view of a modified form of bending apparatus in accordance with the invention.

Figure 7:
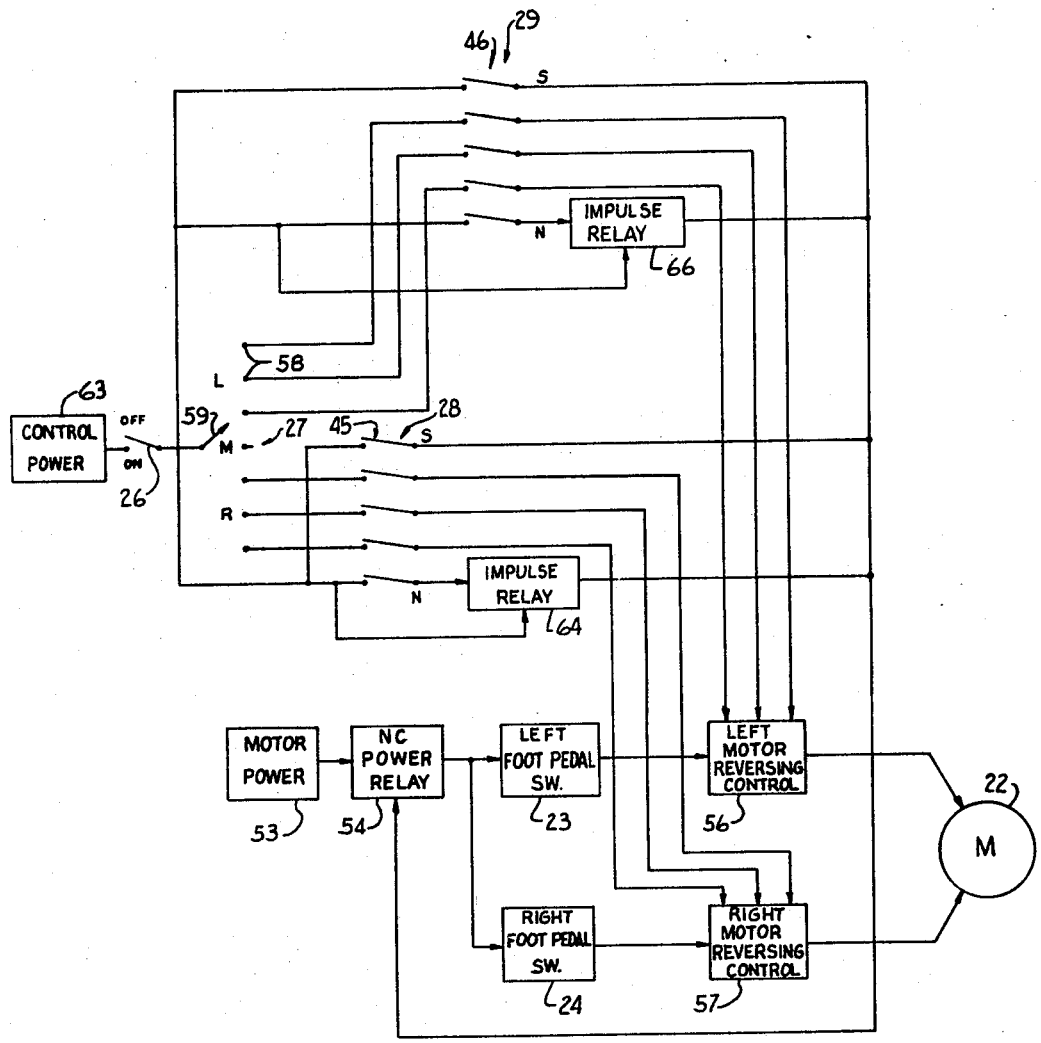
FIGURE 7 is a schematic wiring diagram of the control arrangement.

Referring now to FIGURE 1 in detail, there will be seen to be provided rod bending apparatus 11 including a work table 12 having a pair of parallel transversely spaced upright heads or mandrels 13, 14 rigidly mounted on the top surface thereof. The top of the table is provided with an arcuate slot 16 centered at a point intermediate first ends of the mandrels, such slot extending forwardly of the ends of the mandrels and laterally outwardly adjacent same. The slot extends through an angle of slightly less than 360° to permit rotation through a similar angle of a bending post or arm 17 extending therethrough. The arm is preferably provided as a substantially C-shaped bracket 18 having a roller 19 journalled therein for rotation about a vertical axis. The bracket is mounted for rotation about an axis at the center of the slot 16 such that a stack of rods placed in the space between the mandrels 13, 14 and extending beyond the ends thereof will be engaged by the roller 19 during rotation of the bracket. The rods are in turn bent about the end of one of the mandrels, depending upon which direction the bracket is rotated. The ends of the mandrels are preferably rounded such that in conjunction with the roller 19 a smooth bending operation is provided. It will be appreciated that the angle of bend of the rod that is determined by the angle of rotation of the bracket is relative to the diameter that lies intermediate the mandrels.

In the rotatable mounting of the arm 17, same is preferably coupled to a circular cam disc 21 journalled subjacent the slot 16 so as to be rotatable therewith. A motor 22 (see FIGURE 7) is coupled in driving relation to the arm and disc to effect rotation thereof. Energization of the motor is effected by right and left foot pedal switches 23, 24 which depend from the bottom of the work table 12 and are connected in a control circuit, subsequently described, for controlling operation of the motor. The circuit also includes an on-off switch 26 and bend angle selector switch 27 which are mounted on the front of the work table. When the selector switch 27 is in a manual position thereof, the control circuit is conditioned to energize the motor to drive the arm and disc in a clockwise direction when the right foot pedal switch 23 is depressed, and in a counter-clockwise direction when the left foot pedal switch 24 is depressed. In this mode of operation the disc rotates as long as one of the foot pedal switches is depressed and stops when the foot pedal switch is released. Thus, semiautomatic bending of rods is effected under the control of an operator with the angle of bend being determined by the operator's judgment. The selector switch also has a plurality of automatic positions in which the motor 22 is controlled by a motor control switching arrangement associated with the disc 21 in a manner subsequently described to effect automatic bending of rods through a plurality of predetermined bend angles corresponding to the respective switch positions. More particularly, responsive to actuation of one of the foot pedal switches the motor drives the disc and arm 17 in the corresponding rotational direction. When the disc rotates through the particular angle selected by the switch 27, the control switching arrangement operates to stop and reverse the motor, whereupon the disc and arm are returned to their original position. The angle of bend of rods contacted by the arm is of course the angle through which the rods are bent by rotation of the arm prior to reversal of the motor by the control switching arrangement responsive to the disc rotating through the selected predetermined angle.

Considering now the control switching arrangement in detail as to the particularly salient aspects of the invention, it is to be noted that such arrangement includes a pair of reversing switch banks 28, 29 each having a plurality of vertically stacked switches 31. The switches 31 each have an actuating plunger 32 projecting therefrom. Such plungers are spring loaded in the outward direction and are depressible to actuate the corresponding switches from normally open to closed positions. Preferably, the switch banks each include a plurality of lever arms 33 respectively pivotally secured to the plungers 32. One end of each lever arm is pivotally secured to a common shaft 34, while the other end of the arm carries a roller 36. When a roller is engaged, the associated lever arm is pivoted to depress the plunger of the corresponding switch. The switch banks 28, 29 are mounted within the work table 12 at appropriate positions adjacent the periphery of the disc 21. Actuation of the switches of the respective banks is effected by groups of cams or equivalent switch engaging members 37, 38 carried by the disc at circumferentially spaced positions of the periphery thereof. The members 37 are located on one side of the arm 17 while the members 38 are located on the opposite side of the arm. The members 37, 38 are provided with outwardly projecting lugs 39, 41 for engaging the rollers 36 of the switch banks. The lug of each member 37 is at a different vertical height corresponding to the level of a different one of the rollers of the switch banks, and the lugs of members 38 are similarly arranged. Thus, each of the members 37, 38 is arranged to engage a different one of the rollers of the switch banks 28, 29. The members 37 are adapted to cooperate with switch bank 28, while members 38 cooperate with bank 29. One switch of bank 28 is employed as a right neutral switch and is engageable with a right neutral member 37'. One switch of bank 29 is employed as a left neutral switch and is engageable with a left neutral member 38'. The remaining switches of bank 28 are employed as right (clockwise) movement reversing switches and are engageable with respective ones of the members 37. The remaining switches of bank 29 are employed as left (counterclockwise) movement reversing switches and are engageable with respective ones of the members 38. The right neutral switch of bank 28 is engaged by right neutral member 37' when the angular position of disc 21 is such as to locate the arm to the left of the mandrels 13, 14 for the start of a right hand bending operation. When the right foot pedal 24 is depressed, the disc rotates in the right (clockwise) direction until a predetermined one of the switches of bank 28 is engaged by the corresponding one of members 37. In this regard, only one switch is armed depending on the position of the selector switch 27. When the armed switch is engaged by the corresponding member 37, the motor 22 is responsively stopped and reversed. Bending of the rods is thus terminated and the disc is rotated in the opposite direction, i.e., counterclockwise. The neutral switch of bank 28 is so arranged that when such switch is engaged by the right neutral member 37' the motor is deenergized. The arm 17 is thus at its original position for starting a right hand bend. Operation of the apparatus in making left hand bends is accomplished in a similar manner with the neutral switch of bank 29, the reversing switches of bank 29, and the members 38.

It will be appreciated that in the operation of the control arrangement described above, the angles of bend that are selectable by switch 27 are determined by the circumferential positions of the members 37, 38. In order that the angles may be preset to substantially any desired amount, the members are infinitely adjustable in their circumferential positions on the disc 21. More particularly, the disc is preferably formed with a downwardly turned rim 42. Each of the members 37, 38 is provided with an inclined notch 43 for receiving the rim, preferably with three points of contact for the sake of precise positive locking engagement. A set screw 44 is threaded through the upper end of each member to extend into the notch and engage the upper face of the disc adjacent the rim. The members may thus be moved on the rim to any desired circumferential positions and locked therein upon tightening of the set screws.

The control arrangement of the rod bending apparatus further includes right and left excursion safety switches 45, 46 for preventing the arm 17 from impacting the table 12 at the opposite ends of the slot 16 in the manual or semi-automatic, as well as the automatic mode of operation. Such switches are preferably included in the banks 28, 29 as the uppermost switches thereof. The safety switches are provided with lever arms 47, 48 and rollers 49, 50 in a manner similar to those of the other switches of banks 28, 29. The switches are engageable by switch engaging members 51, 52 mounted on the periphery of the disc at positions corresponding substantially to angles of slightly less than 180° rotation of the arm 17 in either direction. The switches are engaged just prior to the arm rotating 180° in either direction and are connected in the motor energizing circuit to shut the motor off upon being engaged. The motor is thus deenergized before the arm can impact the ends of the slot 16. The members 51, 52 are elevated to correspond to the levels of the switches 45, 46 such that there is no interference between these members and the other switches of the banks as engaged by the members 37, 38.

It will be appreciated that numerous possible circuits exist for connecting the various switches of the control arrangement in controlling relation to the motor 22 to accomplish the various bending operations. One such circuit is schematically depicted in FIGURE 7. As shown therein, a motor power source 53 is coupled by means of a normally closed power relay 54 to both the left and right foot pedal switches 23, 24. The switches are in turn connected through left and right reversing controls 56, 57 to the motor 22. The reversing controls are of a conventional type that effect rotation of the motor in a given direction in the absence of signals at reverse inputs, thereof, and effect rotation of the motor in the opposite direction in the presence of such signals. More particularly, when the left foot pedal switch 23 is depressed, power is applied through the left reversing control 56 to the motor 22 in an appropriate manner to effect rotation of the motor in the left or counter-clockwise direction. Responsive to a signal at one of the reverse inputs of the control the motor is stopped and caused to rotate in the opposite, or clockwise direction. The operation of the right reversing control 57 is similar except the directions of rotation are reversed. The reversing switches (i.e., all switches except the neutral switch and safety switch) of bank 29 are connected to the reverse inputs of control 56, while the reversing switches of bank 28 are connected to the reverse inputs of control 57. The reversing switches of banks 28, 29 are each connected to a different one of a plurality of contacts 58 of the selector switch 27. The central contact of the switch 27 corresponds to the manual mode of operation, while the contacts on opposite sides thereof correspond to the automatic mode of operation in left and right directions for different predetermined bend angles. The selector 59 of switch 27 is coupled through on-off switch 26 to a control power source 63. Thus, when switch 26 is closed, the particular one of the reversing switches of banks 28, 29 that is selected by the selector 59 of switch 27 is armed with power from the source 63. When the selected switch is engaged by the corresponding one of members 37, 38 after the disc 21 has rotated through the appropriate angle to effect such switch engagement, a signal is thus applied to one of the reverse inputs of the reversing controls 56, 57 to stop and reverse the rotation of the motor 22.

The right and left neutral switches of banks 28, 29 are commonly connected to the selector 59 of switch 27. The right and left neutral switches are in turn respectively connected to control inputs of impulse relays 64, 66 which are coupled between the selector 59 of switch 27 and the control input of the power relay 54. The impulse relays are of a type which are normally open and close momentarily for a predetermined time delay in response to impulses at the control inputs thereof, then return to their open position even though the impulse signals persist. The safety switches 45, 46 are connected between the selector 59 of switch 27 and the control input of the power relay 54. The safety switches are thus armed in both the manual and automatic modes of operation.

In the overall operation of the control circuit, consider the arm 17 to be positioned to the right of the mandrels 13, 14 and that it is desired to conduct right hand (clockwise) bending operations. To initially position the arm for such operations, the selector 59 of the selector switch 27 may be placed in engagement with the manual contact thereof. The left foot pedal switch 23 is next depressed to apply power from source 53 through left reversing control 56 to the motor 22 in a manner which effects left (counter-clockwise) rotation thereof. When the arm has rotated to the left of the mandrels, the right neutral switch engaging member 37′ engages the neutral switch of bank 28 to thereby close same. An impulse is thus applied to the control input of relay 64 to effect closure thereof, and a signal is in turn applied to the control input of power relay 54. The power relay opens to thereby deenergize the motor 22 and stop rotation of the cam disc 21 and bending arm. The foot pedal switch is released and subsequently after the predetermined time delay of relay 64 such relay opens. The selector 59 of the angle selector switch 27 is placed in engagement with one of the contacts 58 that corresponds to a desired right hand bend angle. A corresponding one of the switches of bank 28 is thus armed. A stack of rods is placed in the space between the mandrels 13, 14 and the right foot pedal switch 24 is depressed. Power is thus applied through the right reversing control 57 to effect clockwise rotation of the motor 22 and disc 21. When the corresponding member 37 engages the armed switch of bank 28, the switch is closed to apply a reversing signal to the corresponding reverse input of the control 57. The control responsively stops and reverses the motor 22. The angle of bend imparted to the rods is thus determined by the angle of rotation traversed by the disc 21 between its start position and the position wherein the member 37 which corresponds to the selected switch of bank 28 engages such switch. When the disc 21 is rotated counter-clockwise to a position just to the left of the mandrels 13, 14, the neutral switch of bank 28 is engaged by member 37′ and is closed. The relay 64 is momentarily closed and a signal is responsively applied to the power relay 54 to open same and thus deenergize the motor 22. The disc and bending arm 17 are thus automatically stopped in suitable start positions preparatory to the conduct of another right hand bending operation at the same bend angle, or a different right hand bend angle which may be selected by means of switch 27. It will be appreciated that left hand bending operations are conducted in a manner analogous to that just described, but through the use of the left hand controls.

It is to be noted that when the arm 17 is initially positioned to the right of the mandrels 13, 14 and it is desired to conduct right hand (clockwise) bending operations, it is not necessary to use the manual position of the selector switch 27 to initially position the arm 17 to the left of the mandrels in the manner set forth above. Rather, the selector switch 27 can immediately be placed in engagement with the desired right hand bend contact 58, and so that if the left hand foot pedal switch 23 is depressed and released to initiate counterclockwise movement of the arm 17, the arm will move to the left until the neutral switch of bank 28 is engaged by member 37′ and is closed. The arm will thus be positioned to begin making the desired right hand bends.

To conduct manual bending operations, the selector 62 of the mode selector switch 26 is placed in engagement with the manual contact. With rods placed between the mandrels 13, 14, the desired direction of bend is initiated by depressing the corresponding one of the foot pedal switches 23, 24. When the desired angle of bend is observed, the foot pedal switch is released.

In both the automatic and manual modes of operation the safety switches 45, 46 are armed. In the event of extreme rotation of the disc 21, the members 51, 52, engage the corresponding one of the safety switches 45, 46 to close same prior to the time the arm 17 reaches an end of the slot 16. Power is thus applied to the control input of the power relay 54 to open same and thereby deenergize the motor 22. Rotation of the arm is consequently stopped before it impacts the ends of the slot 16.

Referring now to FIGURE 6, there is shown a modified form of bending apparatus provided with a control switching arrangement of the type hereinbefore described. This embodiment includes a work table 67 and a disc 68 journalled for rotation within an aperture 69 provided in the top of the table. The disc is provided with pluralities of recesses 71 equally spaced along a plurality of different diameters thereof. Such recesses serve to receive a pair of pins 72 which may be thus selectively secured to the disc at varied circumferential and radial positions. A pair of rails 73, 74 are provided for mounting transversely of the table on opposite sides of the disc at selectable spaced positions therefrom. In this regard the longitudinal sides of the tables are provided with longitudinally spaced apertures 76 and the opposite ends of each rail carry pins 77 which are releasably engageable with the apertures to thereby facilitate securance of the rails at selective longitudinal positions relative to the disc. Mounted upon each rail there are provided a pair of bending mandrels 78, each preferably including a pair of vertical rollers 79. One of the mandrels may be moved along the rails to different positions transversely of the table.

With the arrangement just described, bending is accomplished by placing rods between the pins 72 with the opposite ends of the rods engaging diagonally opposed ones of the mandrels 78. The disc 68 is then rotated with the pins thus effecting oppositely directed bends at the opposite ends of the rods. As in the case of the first embodiment described herein, the bending angle is determined by the angle of rotation of the disc. Control of the bending angle is accomplished with a control arrangement of the type previously described including motor reversing switches and rotatable switch actuating members. In this regard the cam disc 21 and circumferentially spaced switch actuating members 37, 38 may be integrally associated with the disc 68, and the switch banks 28, 29 mounted within the work table 67 adjacent the cam disc. The switches are coupled to a motor control circuit of the type previously described for controlling operation of a motor coupled in rotatable driving relation to the disc 68. Operation of the bending apparatus is then analogous to that described relative to the first embodiment. However, in some instances it is desirable to effect bends at greater angles than can be controlled by a cam disc that is integrally associated with the rotatable pins or equivalent bending means. The control arrangement is then preferably provided as illustrated in FIGURE 6. In this regard, the cam disc 21 with switch actuating members mounted thereon is provided separate from the disc 68. The cam disc is journalled for rotation within the table at a position spaced from the disc 68 and is coupled thereto by means of a reduction drive 81. The drive may, for example, comprise a relatively large diameter pulley 82 connected to the cam disc 21, a relatively small diameter pulley 83 connected to the disc 68, and a drive belt 84 coupling the pulleys. The switches are mounted adjacent the cam disc and connected in circuit with the drive motor in the manner previously described. By virtue of the reduction drive, the disc 68 rotates through a greater angle than the cam disc 21. Thus, for a given angle of rotation of the cam disc to effect actuation of a selected one of the reversing switches of the switch banks 28, 29, the disc 68 rotates through a greater angle prior to reversal and thus bends the rods through a greater angle than is obtained when the cam disc is integrally associated with the rotary bending means.

What is claimed is:

1. Bending apparatus comprising a work table having upright mandrels mounted thereon, bending means mounted for rotation relative to said mandrels, said mandrels and bending means being adapted to engage elements to be bent whereby said elements are bent through angles determined by angles of rotation of said bending means relative to said mandrels, a cam disc coupled to said bending means for rotation therewith, a plurality of switch engaging members carried by said disc at circumferentially spaced positions, each of said members having an outwardly projecting lug with the lugs of the respective members being at different vertical levels, at least one bank of vertically spaced switches mounted in fixed position adjacent the periphery of said disc with the levels of said switches each corresponding to a different one of the levels of said lugs and being actuatingly engageable thereby, means coupled to said switches for selectively arming same, a motor coupled to said bending means for effecting rotation of same, control circuit means coupled to said motor to selectively energize same to effect said rotation in a given direction, and means connecting said switches in said control circuit means to effect reversal of said given direction of rotation responsive to actuation of the armed one of said switches.

2. Bending apparatus according to claim 1, further defined by said switch engaging members being mounted on said disc for selective circumferential positioning thereon.

3. Bending apparatus according to claim 2, further defined by said disc having a downwardly inclined rim, said switch engaging members each having an inclined notch engaging said rim, and a set screw threaded through each member to extend into the notch thereof and releasably engage the upper face of said disc.

4. Bending apparatus according to claim 1, further defined by said bending means being an upright arm coupled to said cam disc for rotation therewith.

5. Bending apparatus according to claim 1, further defined by said bending means being a second disc journalled for rotation in the top of said table having a pair of diametrically opposed pins projecting upwardly therefrom, and a reduction drive coupling said second disc to said cam disc to rotate the former through a greater angle than the latter.

6. Bending apparatus according to claim 1, further defined by said switches having depressible plungers projecting outwardly therefrom, lever arms respectively pivotally secured at positions intermediate their ends to said plungers, a shaft, said lever arm pivotally secured at first ends thereof to said shaft, said rollers respectively journalled at second ends of said lever arms.

7. Bending apparatus comprising a work table having upright mandrels mounted thereon, bending means mounted for rotation relative to said mandrels, said mandrels and bending means being adapted to engage elements to be bent whereby said elements are bent through angles determined by angles of rotation of said bending means relative to said mandrels, a cam disc coupled to said bending means for rotation therewith, first and second pluralities of circumferentially spaced switch engaging members carried at the periphery of said disc on opposite sides thereof, said members of each plurality thereof respectively having outwardly projecting lugs at different vertical levels, first and second banks of vertically spaced switches mounted in fixed positions adjacent the periphery of said disc on opposite sides thereof, said levels of said switches of each bank respectively corresponding to the different levels of said lugs of each plurality of said switch engaging members and being actuatingly engageable thereby, one switch of each bank being a neutral switch and the remaining switches of each bank being reversing switches, said first plurality of engaging members being on the same side of said disc as said first bank when said neutral switch thereof is engaged by a corresponding one of said first plurality of engaging members, said second plurality of engaging members being on the same side of said disc as said second bank when said neutral switch thereof is engaged by a corresponding one of said second plurality of engaging members, a motor coupled in rotational driving relation to said bending means, a power source, first and second energization effecting means coupled to said power source, control means coupling said first and second energization effecting means to said motor for energizing said motor responsive to actuation of said first effecting means to effect rotation of said disc in a first direction and energizing said motor responsive to actuation of said second effecting means to effect rotation of said disc in a second opposite direction, the neutral switch engaging one of said first plurality of engaging members being the leading one thereof when said disc is rotated in said first direction, the neutral switch engaging one of said second plurality of engaging members being the leading one thereof when said disc is rotated in said second direction, means for selectively arming individual ones of said reversing switches of said first and second banks, means connecting said reversing switches of said first bank to said control means to effect reversal of said motor during actuation of said first effecting means responsive to actuation of the armed one of said reversing switches of said first bank by the corresponding one of said first plurality of engaging members, means connecting said reversing switches of said second bank to said control means to effect reversal of said motor during actuation of said second effecting means responsive to actuation of the armed one of said reversing switches of said second bank by the corresponding one of said second plurality of engaging members, means coupled to said control means for arming said neutral switches and means coupling said neutral switches to said control means for momentarily effecting deenergization of said motor responsive to actuation of one of said neutral switches.

8. Bending apparatus according to claim 7, further defined by said first and second pluralities of switch engaging members being mounted on said disc for selective circumferential positioning thereon.

9. Bending apparatus according to claim 8, further defined by said disc having a downwardly inclined rim, said switch engaging members each having an inclined notch engaging said rim, and a set screw threaded through each member to extend into the notch thereof and releasably engage the upper face of said disc.

10. Bending apparatus according to claim 7, further defined by said bending means being an upright arm coupled to said cam disc for rotation therewith.

11. Bending apparatus according to claim 7, further defined by said bending means being a second disc journalled for rotation in the top of said table and having a pair of diametrically opposed pins projecting upwardly therefrom, and a reduction drive coupling said second disc to said cam disc to rotate the former through a greater angle than the latter.

12. Bending apparatus according to claim 7, further defined by said switches having depressible plungers projecting outwardly therefrom, lever arms respectively pivotally secured at positions intermediate their ends to said plungers, a shaft, said lever arms pivotally secured at first ends thereof to said shaft, and rollers respectively journalled at second ends of said lever arms.

13. Bending apparatus according to claim 7, further defined a pair of safety switches respectively mounted adjacent the periphery of said cam disc on opposite sides thereof, at least one safety switch engaging member mounted on the periphery of said disc, each safety switch engaging member engageable with at least one of said safety switches prior to rotation of said cam disc 180° in either direction from an initial position thereof, and means coupling said safety switches to said control means for effecting deenergization of said motor responsive to actuation of an armed one of said safety switches.

References Cited

UNITED STATES PATENTS

| | | | |
|---|---|---|---|
| 2,382,745 | 8/1945 | Powers | 72—156 |
| 3,181,323 | 5/1965 | Bos | 72—26 |

CHARLES W. LANHAM, *Primary Examiner.*

R. D. GREFE, *Assistant Examiner.*